United States Patent [19]

Johnson

[11] 4,392,390

[45] Jul. 12, 1983

[54] SHIELDING APPARATUS FOR LINEAR ACTUATOR

[75] Inventor: James C. Johnson, Charlotte, N.C.

[73] Assignee: Duff-Norton Company, Charlotte, N.C.

[21] Appl. No.: 239,183

[22] Filed: Mar. 2, 1981

[51] Int. Cl.³ ............................................. F16H 27/02
[52] U.S. Cl. .................................... 74/89.15; 464/173
[58] Field of Search .................... 74/424.8 VA, 89.15; 248/405, 406; 297/347–349; 138/28, 30; 277/101, 34.3, 34.6; 464/173, 183

[56] References Cited

U.S. PATENT DOCUMENTS

| B 428,434 | 2/1976 | Burkhardt et al. | 74/424.8 VA |
| B 499,786 | 3/1976 | Tyler | 74/424.8 VA |
| 3,424,201 | 1/1969 | Sigimura et al. | 138/30 |
| 4,194,718 | 3/1980 | Baker et al. | 74/424.8 VA |
| 4,272,021 | 6/1981 | Standal | 138/30 |

FOREIGN PATENT DOCUMENTS 832171  5/1981  U.S.S.R. ............................. 74/89.15

Primary Examiner—Leslie A. Braun
Assistant Examiner—Andrew Joseph Rudy

Attorney, Agent, or Firm—Richards, Shefte & Pinckney

[57] ABSTRACT

A shielding bladder for the venting arrangement of a linear actuator having a housing, a reciprocable member disposed therein for linear reciprocable movement therethrough, and a venting arrangement in the housing for communicative flow of ambient air into and out of the housing during operation. The bladder is a sleeve sealably affixed exteriorly to the housing enclosing the venting arrangement and defining a chamber between the sleeve and housing that contains a volume of air for contractionally expelling the air into the housing in response to increases in its volumetric capacity resulting upon outward reciprocation of the reciprocating member and expansionally receiving air from the housing in response to decreases in its volumetric capacity upon inward reciprocation of the reciprocating member. Thus, a controlled volume of clean air free of excess moisture is contained in equilibrium between the bladder and the housing to permit normal actuator operation while preventing entrance of debris and excess moisture thereinto through its vent arrangement. A cylindrical cover protects the bladder from degradation by the ambient atmosphere and environment.

7 Claims, 8 Drawing Figures

SHIELDING APPARATUS FOR LINEAR ACTUATOR

BACKGROUND OF THE INVENTION

The present invention relates to linear actuators and particularly to linear actuators of the type having a housing and a linearly reciprocable member disposed therein and projecting therefrom.

Linear actuators of many different types are well known and widely used to convert the power generated by hydraulic or electric motors or the like into linear motion One popular type of linear actuator utilizes a stationary longitudinal housing in which is disposed and from which extends a reciprocable member for linear reciprocal movement relative to the housing. Since the reciprocal movement of the reciprocable member into and out of the housing will normally create widely varying changes in the available internal volumetric capacity of the housing thereby producing recurring increases and decreases in the internal pressure in the housing, actuators of this type are usually provided with a venting arrangement in the housing to permit the admission into and expulsion from the housing of ambient air responsive to the aforesaid volumetric and pressure changes in the housing, whereby the internal housing pressure is maintained in equilibrium during operation of the actuator to avoid any inhibitory or other deleterious effects on the operational performance of the actuator which might be caused by such pressure changes. It will accordingly be understood that such a linear actuator thus functions in this respect essentially as an air pump producing an alternate inflow thereinto and outflow therefrom of ambient air.

In many of the conventional applications to which linear actuators are put, the ambient air often contains moisture and airborne debris which, if drawn into the housing thereof through a vent arrangement therein, will accumulate on and possibly corrode the internal housing surfaces over a period of time and will eventually deleteriously affect the performance of the actuator or possibly cause failure or malfunctioning thereof. For example, linear actuators have particular applicability in heliostats and other solar tracking devices but, because such devices necessarily must operate outdoors in varying climatic conditions, problems are encountered in utilizing linear actuators of the above-described type since the interior of the housing is exposed through the air entering the vent arrangement therein to moisture, dirt, and other debris and to extremes in temperature. Linear actuators embodied in devices of this type must generally be capable of withstanding such conditions over extended periods of time with little or no maintenance and, accordingly, actuators of the above-described type are generally considered unacceptable for use in such systems without some protective arrangement being provided to prevent the entrance of debris and excess moisture into the actuator through its venting system.

In contrast, the present invention provides a unique arrangement for shielding the venting system of linear actuators which is particularly adapted to totally prevent the entrance into the actuator housing of debris of any type and excess moisture without inhibiting the unrestricted operation of the actuator by enclosing the venting system with a bladder arrangement and confining therewithin a controlled predetermined volume of clean air free of excess moisture for equilibrium flow through the venting system into and out of the housing to maintain equilibrium pressure in the actuator housing during reciprocal operation of the actuator.

SUMMARY OF THE INVENTION

The present invention provides an improvement in linear actuators of the type having a housing, a reciprocable member disposed in and projecting from the housing for reciprocating linear movement relative thereto, and a venting arrangement in the housing for admitting to and exhausting from the housing ambient air in response to fluctuations in the volumetric capacity of the housing resulting from the relative reciprocal movement of the reciprocable member respectively out of and into the housing, the improvement basically providing an arrangement shielding the venting system to prevent entrance into the housing of airborne debris and excess moisture while permitting unrestricted operational airflow through the venting assembly. Briefly described, the shielding arrangement comprises a bladder sealably affixed externally to the housing surrounding the venting assembly to expansionally receive and contain air exhausted through the venting arrangement from the housing upon decreases in the volumetric capacity of the housing resulting from reciprocal movement of the reciprocable member into the housing and to contractionally expel contained air through the venting arrangement into the housing upon increases in the volumetric capacity thereof resulting from reciprocal movement of the reciprocable member out of the housing. In this manner, a controlled predetermined volume of clean air free of excess moisture may be constantly contained within and maintained in equilibrium between the housing and the bladder to facilitate unrestricted operation of the actuator while preventing entrance thereinto of external airborne debris and excess moisture.

In the preferred embodiment, the housing of the linear actuator is tubular in shape and the linear actuator includes a rotatable screw which extends into the housing for rotation therewithin, the reciprocable member of the actuator comprising a tube nut assembly threadably mounted within the housing on the screw for reciprocal movement therealong upon rotation thereof. The bladder preferably comprises a substantially cylindrical sleeve formed of a resilient, long-lasting material, such as natural or synthetic rubber, surrounding the housing and sealably affixed annularly thereto on opposite sides of the venting arrangement to form an expansible air chamber between the housing and the sleeve into which the venting arrangement opens. To prevent contractional collapse of the bladder sleeve onto the venting arrangement upon increases in the volumetric capacity of the housing, one end of the bladder sleeve is sealably affixed to the housing closely adjacent the venting arrangement and extends outwardly therefrom. It is additionally preferred that the bladder have a volumetric capacity for air when fully expanded substantially greater than the maximum internal volumetric change in the housing effected through the full range of reciprocal movement of the reciprocable member to further prevent any likelihood of collapse of the bladder that would close the venting arrangement.

To protect the bladder from exposure to the ambient environment surrounding the linear actuator and thereby prevent degradation resulting therefrom, a cylindrical covering sleeve is provided to substantially enclose the bladder.

DESCRIPTION OF THE PREFERRED EMBODIMENT

Figure 1:
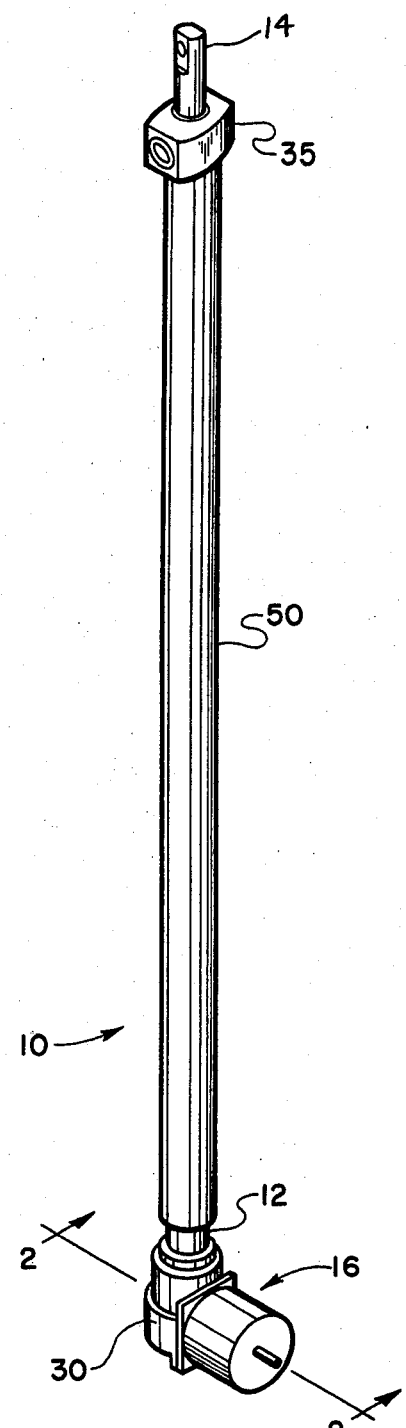
FIG. 1 is a perspective view of a linear actuator in which the preferred embodiment of the improved shielding arrangement of the present invention is incorporated.

Referring now to the accompanying drawings and initially to FIG. 1, the illustrated preferred embodiment of the present invention is incorporated in a linear actuator, generally indicated at 10, particularly adapted for outdoor use in actuating movement of the mirrored reflector of a heliostat in a solar energy collection system for tracking the path of the sun with the reflector. The actuator 10 basically includes a longitudinal, substantially cylindrical, tubular housing 12, a reciprocable member 14 disposed in, extending longitudinally through, and projecting from one end 12' of the housing 12 for reciprocating linear movement relative thereto, and a motorized driving arrangement 16 mounted at the other end 12" of the housing 12 and operably associated with the reciprocable member 14 for actuating its linear reciprocating movement.

Figure 2A:
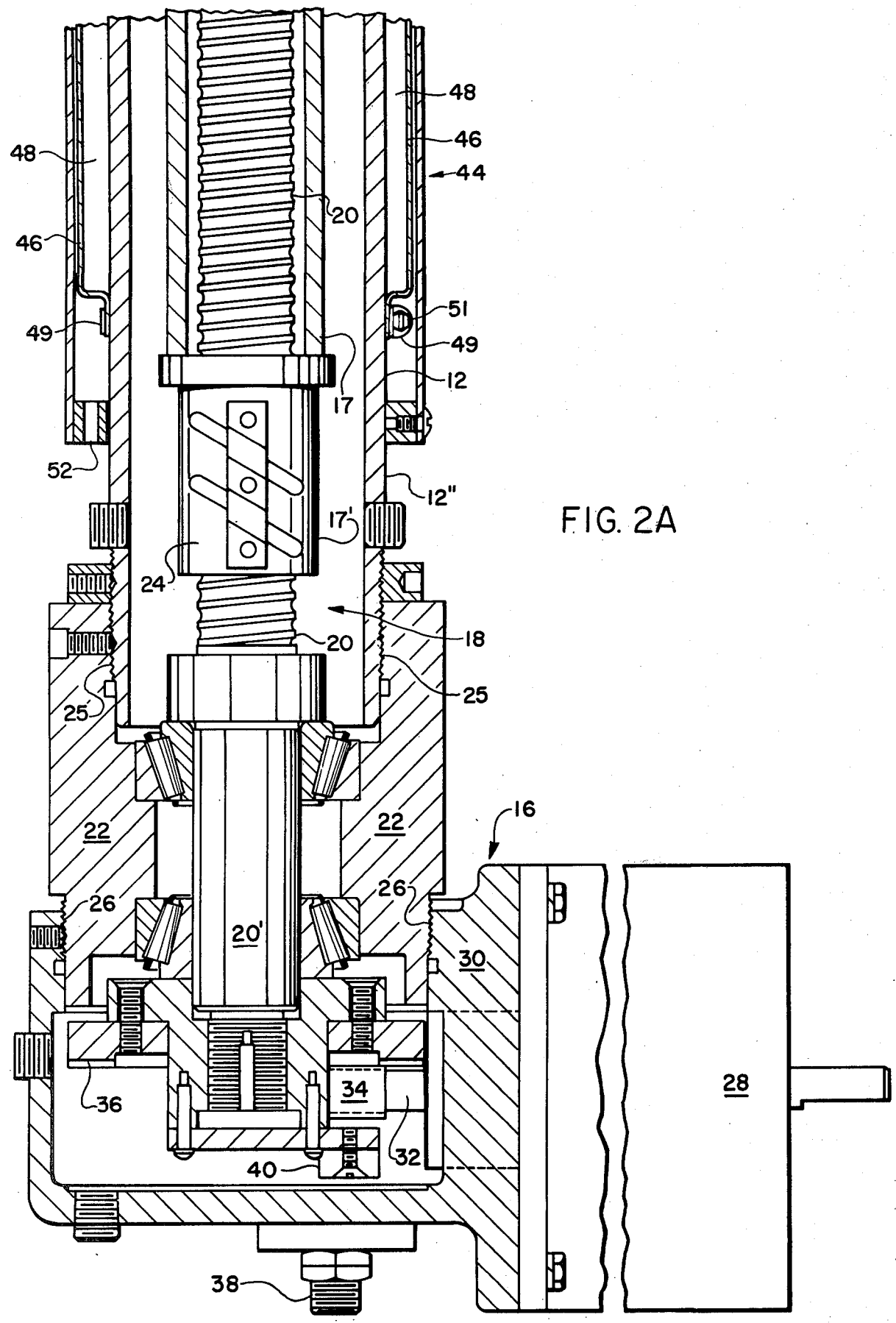
FIG. 2 is a horizontal sectional view of the linear actuator of FIG. 1 taken along line 2—2 thereof, FIG. 2A showing one end of the linear actuator of FIG. 1 and FIG. 2B showing the other end thereof with the longitudinal extent of the housing and reciprocable member contained therein which extend between such ends being partially omitted.
Figure 2B:
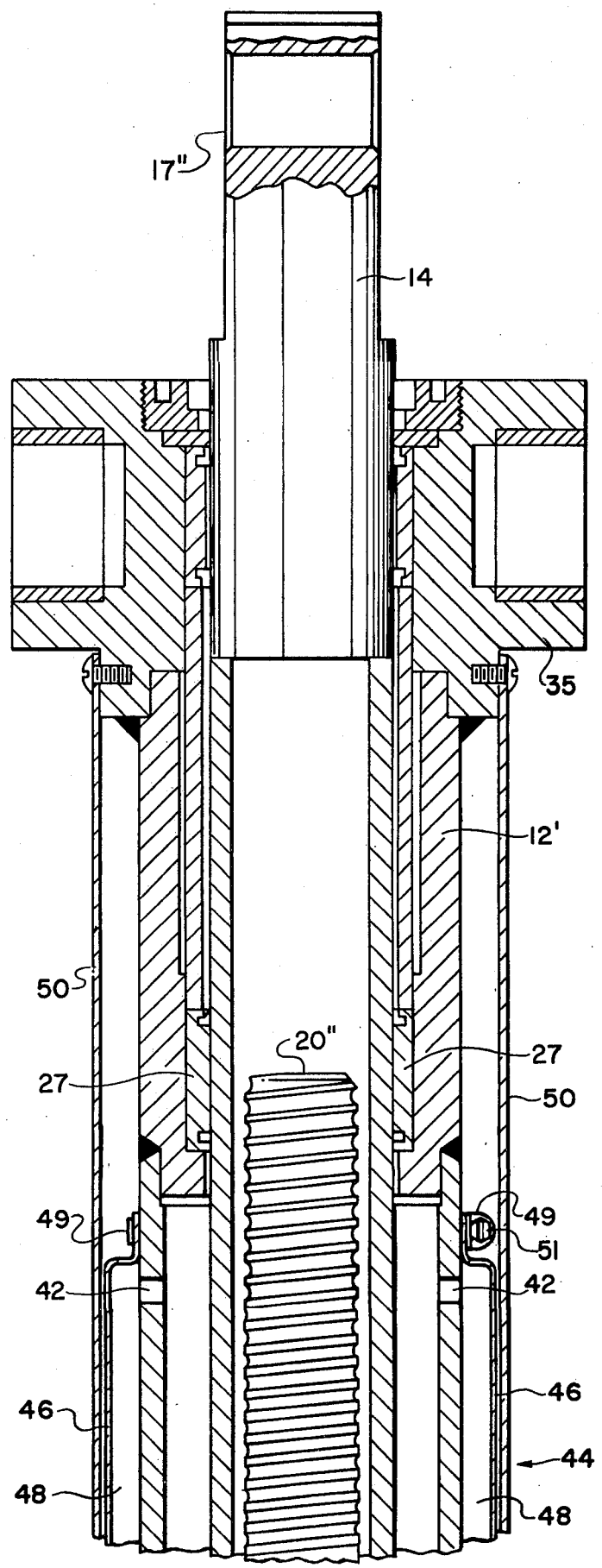
Figure 3:
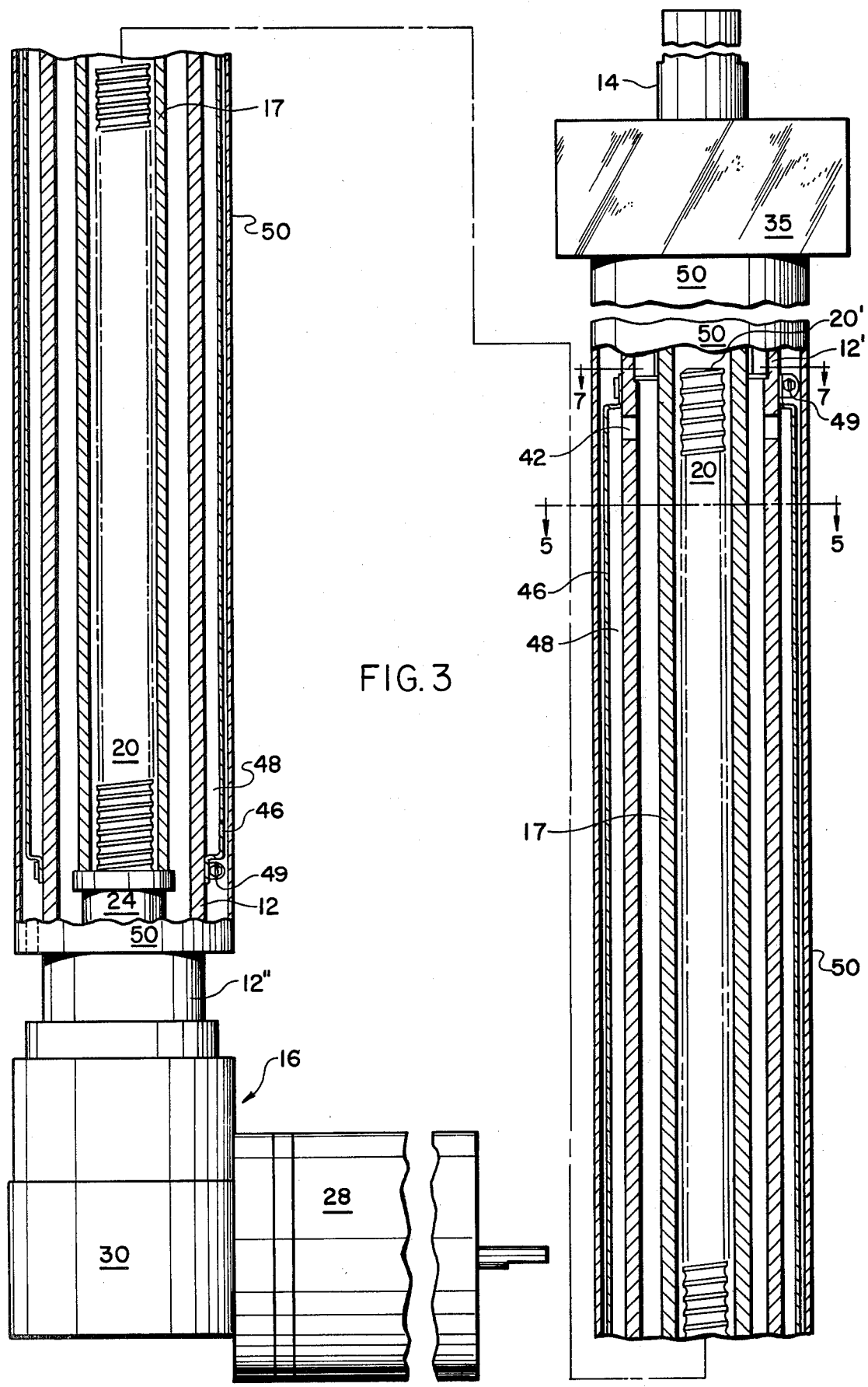
FIG. 3 is a horizontal sectional view of the linear actuator of FIG. 1 also taken along line 2—2 thereof but on a reduced scale from that of FIG. 2, illustrating the longitudinal extent of the housing and reciprocable member of the actuator in its retracted disposition.

As can best be seen in FIGS. 2 and 3, the reciprocating member 14 comprises the tube nut assembly 17 of a conventional ball nut and screw mechanism indicated generally at 18 in FIG. 2A. The ball nut and screw mechanism 18 also includes a longitudinal ball screw 20 which extends longitudinally centrally through substantially the entire length of the housing 12 and is rotatably journaled at one end 20' in a conventional load bearing and journal assembly 22 threadably supported at 25 on the housing 12 at the end 12" thereof, the extending end 20" of the screw 20 being free and unsupported. The tube nut assembly 17 is threadably mounted at its inner end 17' on the ball screw 20 by a conventional ball nut assembly 24 and is journaled in the end 12' of the housing 12 by a bearing assembly 27 whereby it is reciprocable longitudinally with respect to the housing 12 upon rotation of the ball screw 20. As can best be seen in FIG. 2B, the extending end 17" of the tube nut assembly 17 forms a clevis for attachment to an apparatus or device to be linearly reciprocated, e.g., the mirrored reflector of a heliostat as mentioned hereinabove.

The driving arrangement 16 is threadably mounted at 26 on the load bearing and journal assembly 22. The driving arrangement 16 comprises a conventional electrically operated motor 28 mounted on a drive housing 30 transversely with respect to the longitudinal extent of the housing 12, the electric motor 28 having a rotatably drive shaft 32 extending into the drive housing 30 and a pinion gear 34 affixed to the extending end of the shaft 32. The supported end 20' of the ball screw 20 projects from the load bearing and journal assembly 22 into the drive housing 30 and has rigidly mounted on its end 20' a Helicon gear 36 of the type manufactured by Illinois Tool Works, Inc. for rotation with the screw 20 in the drive housing 30. As is best seen in FIG. 2A, the pinion gear 34 of the drive shaft 32 of the electric motor 28 meshes with the Helicon gear 36 for imparting rotational movement to the Helicon gear 36 and thereby to the ball screw 20.

Figure 4:
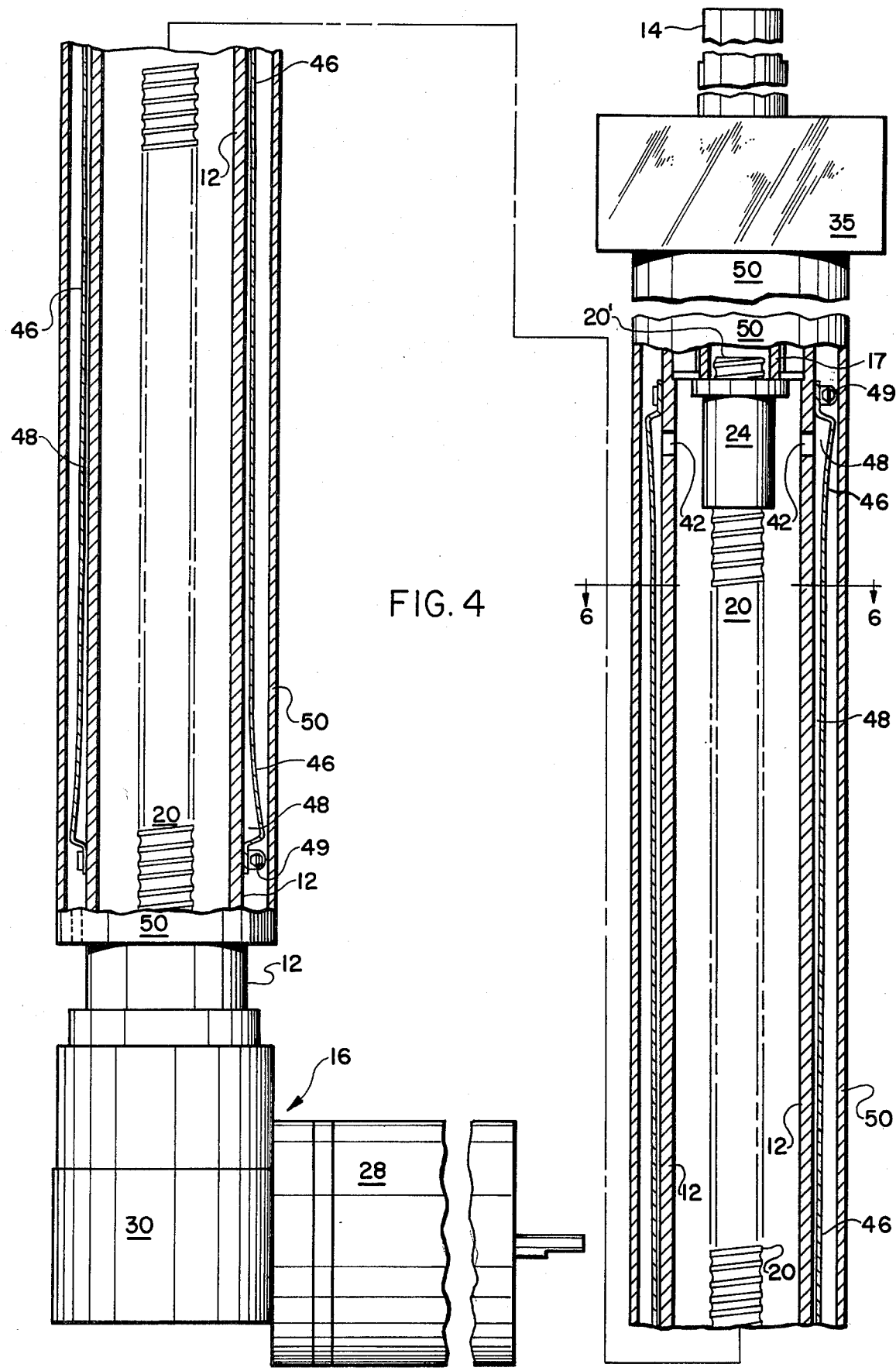
FIG. 4 is a reduced scale horizontal sectional view of the linear actuator of FIG. 1 similar to FIG. 3 but illustrating the reciprocable member moved to its extended disposition projecting outwardly from the housing.

The operation of the linear actuator 10 will thus be understood, the actuation of the electric motor 28 to effect rotation of its shaft 32 imparting rotation to the Helicon gear 36 and thereby to the ball screw 20. With reference to FIGS. 3 and 4, it will be seen that the operation of the linear actuator 10 is effective to reciprocate the tube nut assembly 17 longitudinally outwardly from the end 12' of the housing 12 by continued rotation of the ball screw 20 in this manner, with the tube nut assembly 17 being restrained against rotation by attachment of the clevis end 17" thereof to the load. To provide for the reciprocating return of the tube nut assembly 17 along the screw 20 from an extended disposition such as in FIG. 4 to a retracted disposition such as in FIG. 3, the electric motor 28 is of the type capable of reversing rotation of its shaft 32 whereby, upon the tube nut assembly 17 reaching a predetermined extended disposition such as in FIG. 4, the motor 28 may be reversed to impart reversed rotation to its shaft 32, the pinion gear 34, the Helicon gear 36 and the screw 20 to thereby reverse the longitudinal movement of the tube nut assembly 17 for reciprocatory movement thereof inwardly along the screw 20. A sensor switch 38 is affixed to the drive housing 30 eccentrically with respect to the axis of rotation of the Helicon gear 36 and a magnet 40 is mounted to the Helicon gear 36 for rotation in a path passing adjacent the sensor switch 38, the sensor switch 38 being of a conventional type to electrically sense and register each passage thereby of the magnet 40 whereby the revolutions of the Helicon gear 36 end of the screw 20 may be monitored. The sensor switch 38 is electrically operably associated with the motor 28 through conventional electrical control circuitry to effect a reversal thereof after a predetermined number of revolutions of the screw 20 and, in this manner, the linear actuator 10 is automatically operable to alternately reciprocate the tube nut assembly 17 between selected retracted and extended dispositions such as shown in FIGS. 3 and 4.

The actuator 10 is preferably embodied in a heliostat-operated solar energy collection system of the type utilizing a conventional mirrored reflector (not shown) to track the path of the sun and reflect its rays to a collector for conversion of the solar energy into electrical energy. A conventional mounting arrangement is provided for pivotably supporting the reflector for pivotal tracking movement in both elevational and azimuthal modes, the mounting arrangement being supported from a bracket assembly which is pivotable about a vertical axis to provide the azimuthal component of movement to the pivotal tracking movement of the reflector. The actuator 10 is disposed vertically in the system with the outer end of the tube nut assembly 17 uppermost and pivotably affixed eccentrically to the underside of the reflector to provide the elevational component of movement to the pivotal tracking movement of the reflector by linear reciprocation of the tube nut assembly 17. The outermost end of the actuator housing 12 has rigidly affixed thereto a trunnion sleeve and tube assembly 35 (FIG. 2B) by which the actuator 10 is pivotably supported by pins (not shown) on the bracket assembly in the aforesaid vertical disposition for pivotal movement of the actuator 10 about a horizontal axis substantially perpendicular to the axis about which the bracket assembly pivots. For clarity of illustration, the trunnion sleeve and tube assembly 35 is shown in FIG. 2B ninety degrees (90°) out of required operating position thereof shown in FIG. 1. In this manner, the actuator 10 can pivot about the trunnion pins to permit arcuate movement of the outer end of the tube nut assembly 17 so that it can follow the arcuate path of its connection to the reflector upon elevational pivotal movement of the reflector upon operation of the actuator 10. The linear reciprocation of the tube nut assembly 17 with respect to the housing 12 of the linear actuator 10 provides the elevational mode of pivotal movement to the reflector, while the pivotal movement of the bracket assembly about a vertical axis provides the azimuthal mode of pivotal movement to the reflector. The combination of the mutually independent elevational and azimuthal modes of movement makes possible the tracking by the reflector of any path of the sun throughout the year. In a typical solar energy collection system, a plurality of heliostat and linear actuator arrangements of the above-described type would be provided with each being arranged to reflect the rays of the sun at a single central collector for converting the solar energy into electrical energy.

As described hereinabove, the reciprocatory movement of the tube nut assembly 17 into and out of the housing 12 will produce changes in the volumetric capacity of the housing 12 directly related to the volumetric extent of the housing 12 occupied by the tube nut assembly 17. With such volumetric changes necessarily occur corresponding changes in the internal pressure in the housing 12. To facilitate the operation of the linear actuator 10 without restrictions imposed by changing internal pressure in the housing 12, the housing 12 is provided with a venting system comprising a plurality of apertures 42 spaced circumferentially about the housing 12 for admitting and exhausting therethrough respectively into and from the housing 12 ambient air in response to the aforesaid operational fluctuations in volumetric capacity and internal pressure in the housing 12 resulting from the relative reciprocal movement of the tube nut assembly 17 in the housing 12. In this manner, ambient air is admitted to the housing 12 during outward reciprocation of the tube nut assembly 17 to compensate for the decreasing pressure in the housing 12 caused by its resultingly increasing volumetric capacity. The admitted air is subsequently expelled from the housing 12 during the inward reciprocation of the tube nut assembly 17 in response to the resultingly increasing pressure and decreasing volumetric capacity in the housing 12.

Figure 5:
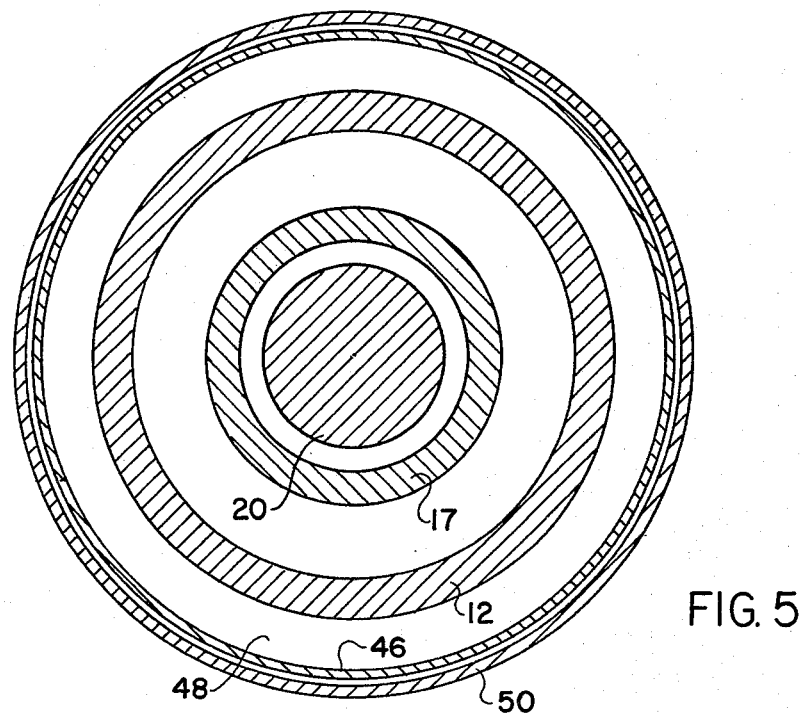
FIG. 5 is a vertical sectional view of the linear actuator of FIG. 1 taken along line 5—5 of FIG. 3.
Figure 6:
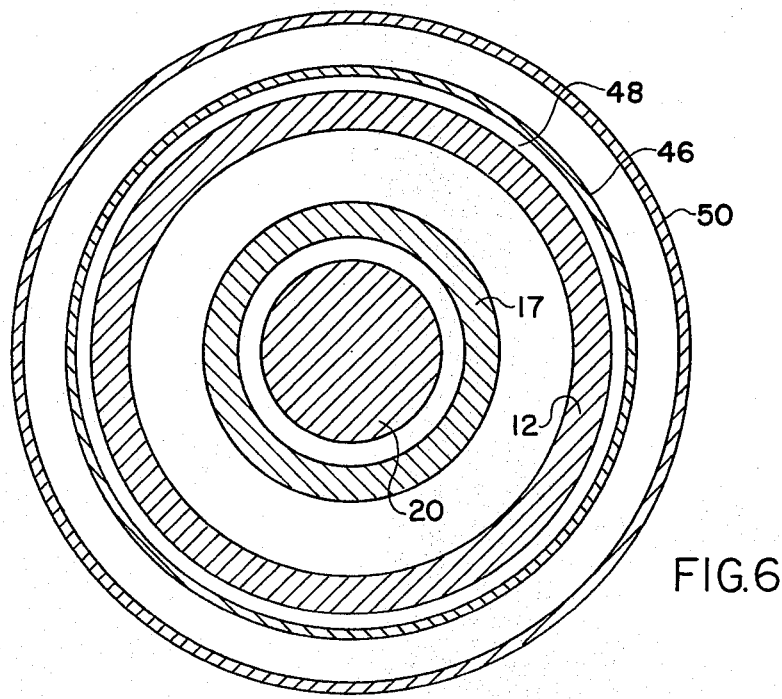
FIG. 6 is a vertical sectional view of the linear actuator of FIG. 1 taken along line 6—6 of FIG. 4.
Figure 7:
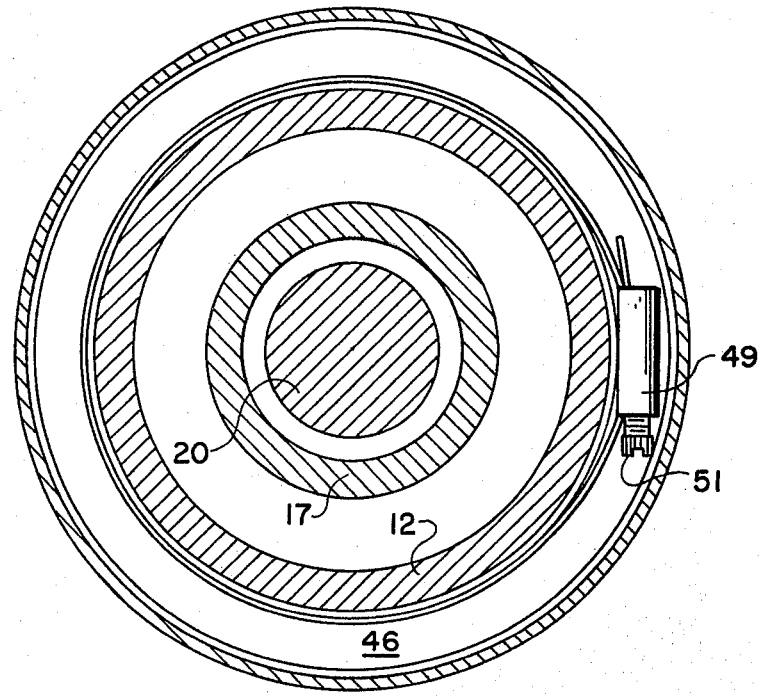
FIG. 7 is a vertical sectional view of the linear actuator of FIG. 1 taken along line 7—7 of FIG. 3.

According to the present invention, a unique shielding arrangement is provided to prevent entrance through the apertures 42 and into the housing 12 of moisture, airborne debris and the like which may be carried in the ambient air. The shielding arrangement is generally indicated in FIG. 2 at 44 and comprises a cylindrical sleeve 46 of a resilient material, such as natural or synthetic rubber, e.g., nitrile butadiene synethetic rubber, surrounding the housing 12 and sealably affixed annularly to the exterior thereof at its ends 12', 12" on opposite sides of the apertures 42, the sleeve 46 thereby forming a bladder sealably enclosing the venting system of the linear actuator and providing an expansible air storage and supply chamber 48 therefor defined annularly between the housing 12 and the sleeve 46. Preferably, the bladder sleeve 46 is sealed to the housing 12 utilizing both an adhesive sealant and an annular clamp 49 operated by tightening screws 51 to hold the ends of the sleeve 46 against the housing 12. As will thus be understood, the cylindrical sleeve 46 contains a quantity of air which is free of debris and excess moisture and is operable to contractionally expel the contained air through the apertures 42 into the housing 12 upon increases in the volumetric capacity of the housing 12 resulting from outward reciprocation of the tube nut assembly 17 (FIGS. 4 and 6) and to expansionally receive and contain the air upon return thereof through the apertures 42 from the housing 12 upon decreases in the volumetric capacity of the housing 12 resulting from the inward reciprocation of the tube nut assembly 17 (FIGS. 3, 5 and 7).

The volumetric capacity of the bladder sleeve 46 for air is substantially greater than the maximum internal volumetric change in the housing 12 produced through the full range of movement of the tube nut assembly 17 from its retracted disposition of FIG. 3 to its entended disposition of FIG. 4, to thereby provide for the containment of a sufficient volume of air in the chamber 48 in the retracted disposition of FIG. 3 such that the linear actuator 10 can be operated without restriction through the full range of reciprocal movement of its tube nut assembly 17. As will be understood, the containment in the chamber 48 of a greater than required quantity of air also helps to prevent any possibility of contractional collapse of the bladder sleeve 46 onto the apertures 42 during the outward reciprocation of the tube nut assembly 17 since a certain minimal volume of air will remain in the chamber 48 even when the tube nut assembly 17 is fully extended and the housing 12 attains its maximum volumetric capacity. For example, in the preferred embodiment of the present invention in a linear actuator utilized in a heliostat-controlled solar energy collection system in which actuator the total maximum volumetric change in the housing thereof through the full range of reciprocal movement of the tube nut assembly 17 measures approximately eighty-six and four-tenths (86.4) cubic inches, the bladder sleeve 46 is constructed to have a fully expanded volumetric capacity of one hundred thirty-three and six-tenths (133.6) cubic inches. To provide the required volumetric capacity for the chamber 48 and also to further prevent contractional collapse of the bladder sleeve 46, the sleeve 46 is offset radially inwardly at its ends and is affixed to the housing 12 with its outer end spaced closely adjacent the apertures 42. In this manner, the offset ends of the sleeve 46 not only facilitate the adhesion and clamping thereat of the sleeve 46 to the housing 12 but also provide a resilient memory to the sleeve 46 at a location annularly adjacent the apertures 42 whereby the sleeve 46 tends to extend outwardly from the apertures 42 and to accordingly resist collapse thereonto.

As will be appreciated by those skilled in the art, use of the above arrangement outdoors, such as in a heliostat, will expose the bladder sleeve 46 to the ultraviolet rays of the sun and to varying climatic conditions all of which have a deteriorative effect on natural and many synthetic rubber materials. In such environments, the bladder sleeve 46 is preferably formed of a deterioration-resistant synthetic rubber material such as chlorosulfonated polyethylene, e.g., "Hypalon" brand synthetic rubber produced by E. I. DuPont de Nemours & Co., Inc., or a fluorocarbon polymer or other fluoroelastomer such as is derived from the combination of vinylidene fluoride and hexafluoropropylene, e.g., "Viton" brand synthetic rubber also produced by E. I. DuPont de Nemours & Co., Inc. Additionally, the shielding arrangement of the present invention may be provided with a cylindrical covering tube 50 affixed to the housing 12 substantially surrounding and enclosing the bladder sleeve 46 to protect it from degradation and the deleterious effects which might result from exposure of the bladder sleeve 46 to sun rays and the ambient atmosphere surrounding the linear actuator 10. The covering tube 50 is provided with vents 52 at its inward end to provide sufficient communication between the interior thereof and the ambient atmosphere whereby the pressure within the cover 50 exteriorly of the bladder sleeve 46 is maintained approximately equivalent to the ambient atmospheric pressure for proper contracting and expanding of the bladder sleeve 46 within the cover 50.

As will be appreciated by those skilled in the art, the shielding arrangement of the present invention thus provides a controlled predetermined volume of clean air free of excess moisture for operational admission into and expulsion from the housing of a linear actuator which volume of air is constantly contained within and maintained in equilibrium between the housing and the shielding arrangement unexposed to the conditions of the ambient atmosphere and environment of the linear actuator. The advantages of this arrangement will be apparent. The admission into the housing of the linear actuator of moisture, debris and the like is totally prevented without restricting in any manner the normal operation of the actuator. Accordingly, the linear actuator is capable of significantly longer and more widely varied types of service without malfunctioning or failure than conventional actuators having no such shielding arrangement.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. In a linear actuator of the type having a housing and a reciprocable member disposed in and projecting from said housing for reciprocating linear movement relative thereto, said housing having vent means for admitting to and exhausting from said housing ambient air responsive to fluctuations in the volumetric capacity of said housing resulting from the relative reciprocal movement of said reciprocable member respectively out of and into said housing, the improvement comprising means for shielding said vent means to prevent entrance of airborne debris and excess moisture into said housing while permitting unrestricted operational airflow through said vent means, said shielding means including bladder means sealably affixed externally to said housing surrounding said vent means for expansionally receiving and containing air exhausted through said vent means from said housing upon decreases in the volumetric capacity of said housing resulting from reciprocal movement of said reciprocable member into said housing and for contractionally expelling contained air through said vent means into said housing upon increases in the volumetric capacity of said housing resulting from reciprocal movement of said reciprocable member out of said housing, whereby a controlled predetermined volume of air may be constantly contained within and maintained in equilibrium between said housing and said bladder means to facilitate unrestricted operation of said linear actuator while preventing entrance thereinto of external airborne debris and excess moisture.

2. The improvement in a linear actuator according to claim 1 and characterized further in that said shielding means includes cover means substantially enclosing said bladder means for protecting it from exposure to the ambient environment about said linear actuator to prevent degradation resulting therefrom.

3. The improvement in a linear actuator according to claim 1 and characterized further in that said bladder means comprises a sleeve surrounding said housing and affixed annularly thereto on opposite sides of said vent means of said housing to form an expansible air chamber between said housing and said sleeve into which said vent means opens.

4. The improvement in a linear actuator according to claim 3 and characterized further in that said housing is tubular in shape, said bladder sleeve is substantially cylindrical, and said shielding means includes a cylindrical covering sleeve substantially enclosing said bladder sleeve for protecting it from exposure to the ambient environment about said linear actuator to prevent degradation resulting therefrom.

5. The improvement in a linear actuator according to claim 4 and characterized further in that one end of said bladder sleeve is sealably affixed to said housing closely adjacent said vent means and in that said bladder sleeve is formed of a resilient material and extends outwardly from said vent means at said one end to prevent contractional collapse of said bladder sleeve onto said vent means upon increases in the volumetric capacity of said housing.

6. The improvement in a linear actuator according to claim 1 and characterized further in that said bladder means has a volumetric capacity for air when fully expanded substantially greater than the maximum internal volumetric change in said housing effected through the full range of reciprocal movement of said reciprocable member.

7. The improvement in a linear actuator according to claim 1 or 5 and characterized further in that said linear actuator includes rotatable screw means extending into said housing for rotation therewithin, said reciprocable member comprising nut means threadably mounted within said housing on said screw means for reciprocal movement therealong upon rotation thereof.

* * * * *